(12) United States Patent
Smirnov et al.

(10) Patent No.: US 8,115,357 B2
(45) Date of Patent: Feb. 14, 2012

(54) MOTOR

(75) Inventors: Viatcheslav Smirnov, Suwon-si (KR);
Sang-Kyu Lee, Suwon-si (KR);
Nam-Seok Kim, Osan-si (KR)

(73) Assignee: Samsung Electro-Mechanics Co., Ltd.,
Gyunggi-Do (KR)

( * ) Notice: Subject to any disclaimer, the term of this patent is extended or adjusted under 35 U.S.C. 154(b) by 287 days.

(21) Appl. No.: 12/651,025

(22) Filed: Dec. 31, 2009

(65) Prior Publication Data
US 2011/0031834 A1 Feb. 10, 2011

(30) Foreign Application Priority Data
Aug. 6, 2009 (KR) .................. 10-2009-0072430

(51) Int. Cl.
*H02K 5/16* (2006.01)
(52) U.S. Cl. ........................ 310/90; 310/67 R
(58) Field of Classification Search ............... 310/67 R, 310/90, 401–402
See application file for complete search history.

(56) References Cited

U.S. PATENT DOCUMENTS

| | | | | |
|---|---|---|---|---|
| 4,007,390 A | * | 2/1977 | Muller et al. | 310/90 |
| 5,210,665 A | * | 5/1993 | Nishizawa | 360/99.08 |
| 5,254,895 A | * | 10/1993 | Koizumi | 310/156.06 |
| 5,633,856 A | * | 5/1997 | Mukawa | 720/712 |
| 5,644,419 A | * | 7/1997 | Choi | 359/198.1 |
| 6,040,649 A | * | 3/2000 | Horng | 310/91 |
| 6,339,273 B1 | * | 1/2002 | Higuchi | 310/91 |
| 2002/0037116 A1 | * | 3/2002 | Nishida et al. | 384/100 |

FOREIGN PATENT DOCUMENTS

| | | |
|---|---|---|
| JP | 07-059324 | 3/1995 |
| KR | 10-2007-092004 | 9/2007 |

OTHER PUBLICATIONS

Korean Office Action, with partial English translation, issued in Korean Patent Application No. 10-2009-0072430, mailed Jan. 26, 2011.

* cited by examiner

*Primary Examiner* — Thanh Lam
(74) *Attorney, Agent, or Firm* — McDermott Will & Emery LLP

(57) ABSTRACT

A motor is disclosed. In accordance with an embodiment of the present invention, the motor includes a rotational axis, a rotating body, which rotates together with the rotational axis as one unit, a hub having a ring-shaped body and a protruding part, in which the ring-shaped body is interposed between the rotational axis and the rotating body and the protruding part is protruded from the ring-shaped body towards the rotational axis and is in contact with the rotating body so as to extend an outer circumferential surface of the ring-shaped body coupled to the rotating body, and a housing, which supports and rotates the rotational axis, in which the housing having a supporting part is interposed between the rotational axis and the protruding part of the hub and supports the rotational axis. Thus, the rotor can be safely supported, providing the rotational stability of the rotor.

12 Claims, 7 Drawing Sheets

MOTOR

CROSS-REFERENCE TO RELATED APPLICATIONS

This application claims the benefit of Korean Patent Application No. 10-2009-0072430, filed with the Korean Intellectual Property Office on Aug. 6, 2009, the disclosure of which is incorporated herein by reference in its entirety.

BACKGROUND

1. Technical Field

The present invention relates to a motor.

2. Description of the Related Art

Generally, spindle motors are commonly used in electronic products, for example, computer drives, which require accurately-rotating devices. Such spindle motors are extremely promising because the spindle motors can be rotated at a high speed with less power consumption and can be readily controlled with high precision.

A typical spindle motor is constituted by a rotating rotor and a stator, which supports the rotating movement of the rotor, and such rotor is typically constituted by a rotational axis and a rotating body coupled to the rotational axis.

One of the drawbacks of conventional motors in step with the trends towards a thinner motor is that the rotational axis and the rotating body are coupled in a smaller area, thereby lowering the rotor's stability. In other words, as the motors become thinner, the length of the rotational axis coupled to the rotating body also becomes shorter, reducing the surface area of the rotational axis supporting the rotating body. As a result, the coupling strength between the rotating body and the rotational axis becomes weaker, and thus the resistance against vibrations occurred when the rotor rotates also becomes weaker, lowering the rotor's stability.

Furthermore, due to the various thicknesses of the motors, parts and production lines need to be designed for a specific purpose only, thus complicating the manufacturing process and increasing the manufacturing cost. In other words, since parts designed for use in one motor are not compatible for use in other motors of different thicknesses, a different design has to be made each time, and parts and production lines have to be made according to the corresponding design.

SUMMARY

The present invention provides a motor that can secure stability when the rotor rotates.

The present invention also provides a motor that can be standardized in design and manufacturing.

An aspect of the present invention provides a motor that includes a rotational axis, a rotating body, which rotates together with the rotational axis as one unit, a hub having a ring-shaped body and a protruding part, in which the ring-shaped body is interposed between the rotational axis and the rotating body and the protruding part is protruded from the ring-shaped body towards the rotational axis and is in contact with the rotating body so as to extend an outer circumferential surface of the ring-shaped body coupled to the rotating body, and a housing, which supports and rotates the rotational axis, in which the housing having a supporting part is interposed between the rotational axis and the protruding part of the hub and supports the rotational axis.

The housing can further include a cylindrical mounting part, in which an electromagnet and a base plate are slid on an outer circumferential surface for height adjustment.

The electromagnet and the base plate can be fitted on the mounting part of the housing.

The housing can further include an outer shelf part, which connects the supporting part to the mounting part, and the motor can further include a magnet mounted on the outer shelf part.

The magnet can be disposed asymmetrically about the rotational axis.

The housing can further include an insertion hole, through which the rotational axis penetrates, and an inner shelf part, which expands the insertion hole, and the motor can further include a rotor support, which is coupled to the inner shelf part and supports the rotational axis.

The rotor support can be fitted in the insertion hole of the housing.

The motor can further include a bearing, which is interposed between the hosing and the rotational axis and has a flange supported by the inner shelf part. The bearing can further include a friction reduction indentation formed in a depressed center portion of a rotational axis hole, into which the rotational axis is inserted.

An end part of the friction reduction indentation on the flange side can be positioned on the same line as an end part of the flange. A circulation indentation, through which a lubricant is circulated, can be formed on an outer circumferential surface of the bearing in a lengthwise direction of the bearing.

A ventilation indentation can be formed on an outer circumferential surface of the mounting part in a lengthwise direction of the cylindrical mounting part.

Additional aspects and advantages of the present invention will be set forth in part in the description which follows, and in part will be obvious from the description, or may be learned by practice of the invention.

DETAILED DESCRIPTION

A motor according to a certain embodiment of the present invention will be described below in more detail with reference to the accompanying drawings.

Figure 1:
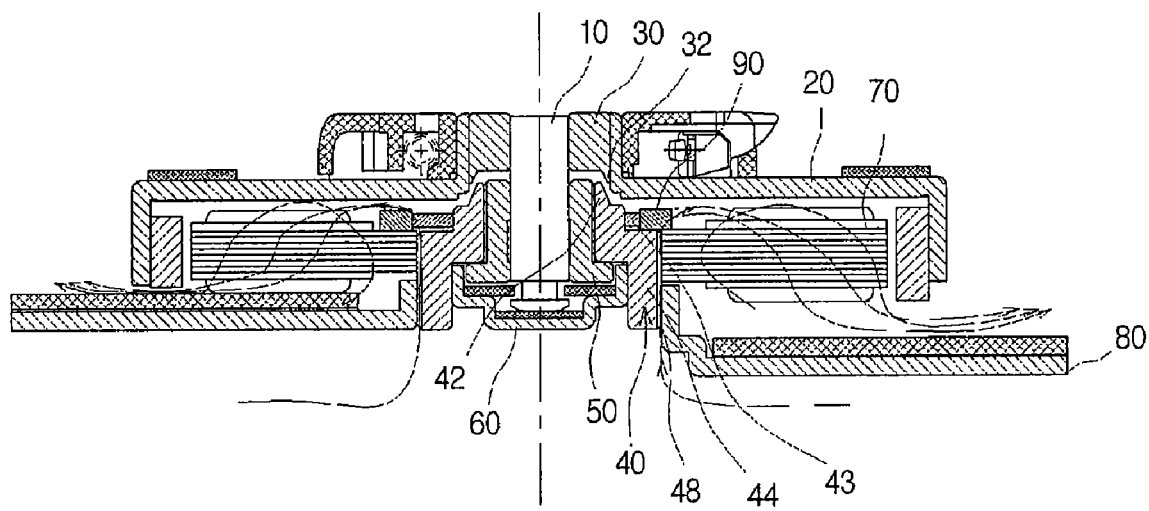
FIG. 1 is a cross-sectional view of a motor in accordance with an embodiment of the present invention.
Figure 2:
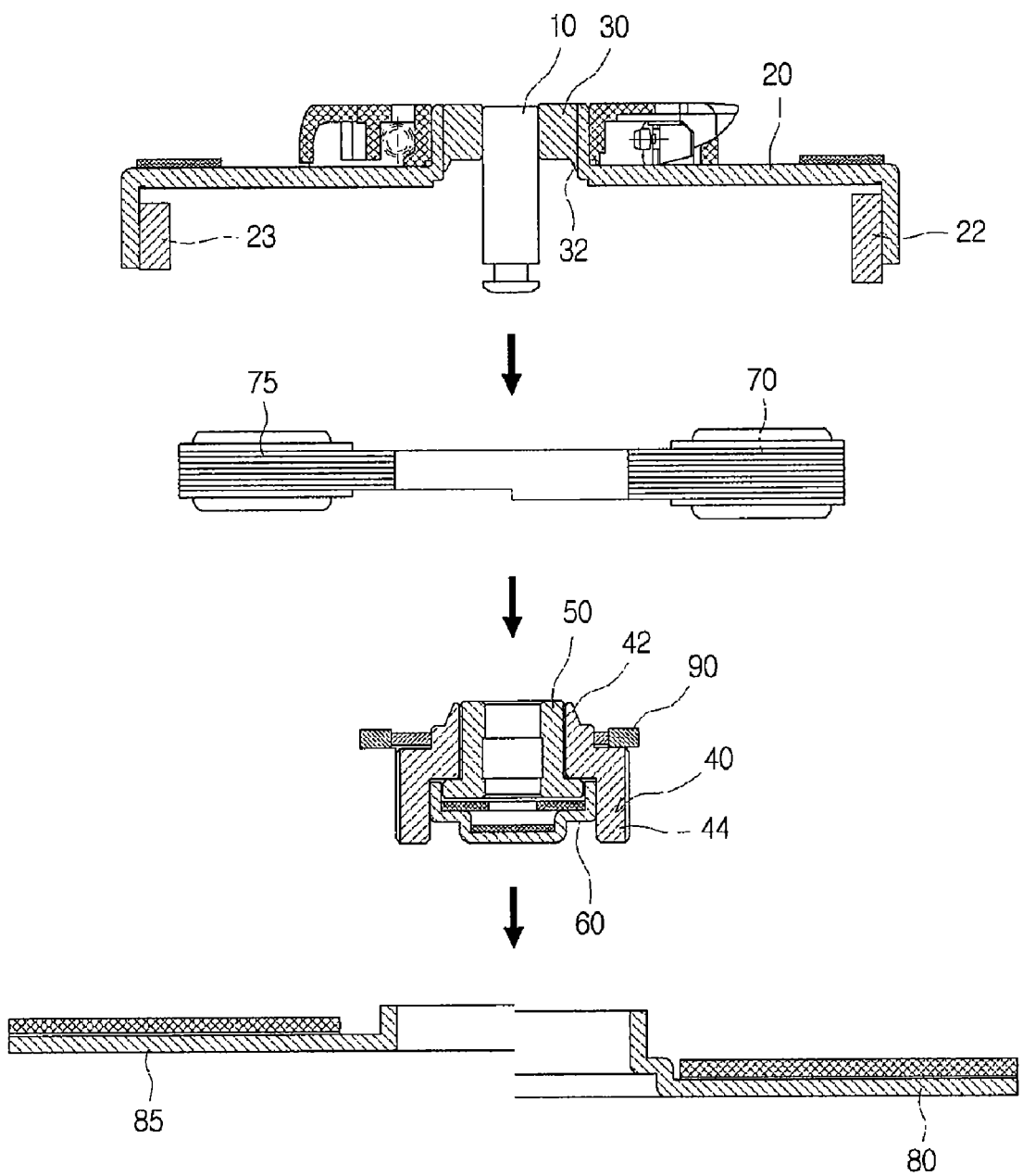
FIGS. 2 and 3 are exploded perspective views of a motor in accordance with an embodiment of the present invention.
Figure 3:
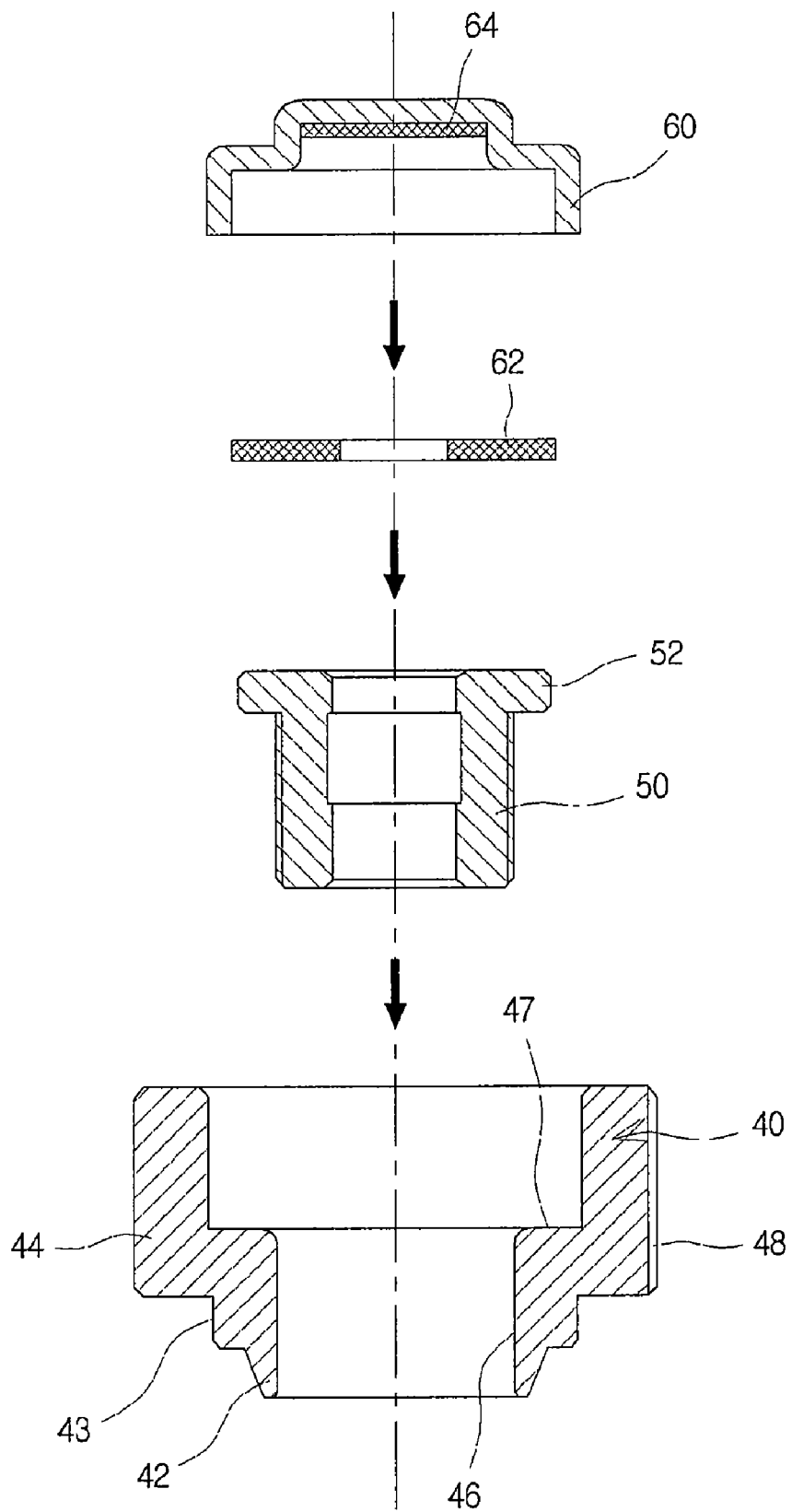

FIG. 1 is a cross-sectional view of a motor in accordance with an embodiment of the present invention. FIGS. 2 and 3 are exploded perspective views of a motor in accordance with an embodiment of the present invention.

The motor according to an embodiment of the present invention includes a rotational axis 10, a rotating body 20, a hub 30 and a housing 40.

The rotational axis 10 is an axis of the rotation of the rotor and is the part that supports the entire rotor when the rotor rotates. For this, the rotational axis 10 is supported by the housing 40, which will be described later.

In this embodiment, a bearing 50 is interposed between the rotational axis 10 and the housing 40 to support and rotate the rotational axis 10.

The rotating body 20 rotates together with the rotational axis 10 as a single unit with the rotational axis 10. For this, the rotating body 10 is connected to the rotational axis 10 by being coupled to the hub 30, which will be described later.

The rotating body 20 of the present embodiment functions as a rotor case, and the hub 30 is coupled to a through-hole formed in a center portion of the rotating body 20.

The hub 30 is the part that combines the rotational axis 10 and the rotating body 20 as one unit, and can have a ring-shaped body that is interposed between the rotational axis 10 and the rotating body 20. Here, since the hub 30 can be formed as thick as how much the hub can be coupled with the rotational axis 10, the hub 30 can be firmly coupled to the rotational axis 10 to widen the diameter of an area in which the rotational axis 10 is coupled.

Particularly, the hub 30 of the present embodiment has a protruding part 32, which extends the outer surface of the body being coupled to the rotating body 20, so as to increase the coupling strength between the hub 30 and the rotating body 20. The protruding part 32 is protruded from the body towards the rotational axis 10 and formed to be in contact with the rotating body 20.

Accordingly, the rotational axis 10 can be coupled to the rotating body 20 with a stronger coupling strength when the rotational axis 10 is coupled to the rotating body 20 by way of the hub 30 than when the rotational axis 10 is directly coupled to the rotating body 20. Thus, the resistance against vibrations occurred when the rotor rotates can be increased, improving the rotor's rotation stability.

Here, the protruding part 32 is protruded towards the housing 40, which will be described later. Therefore, since the forming of the protruding part 32 does not increase the thickness of the motor, the hub 30, in which the protruding part 32 is formed, contributes to make the motor thinner.

The housing 40 supports the rotational axis 10 and has a supporting part 42, which is interposed between the rotational axis 10 and the protruding part 32 of the hub 30 and which supports the rotational axis 10.

Figure 4:
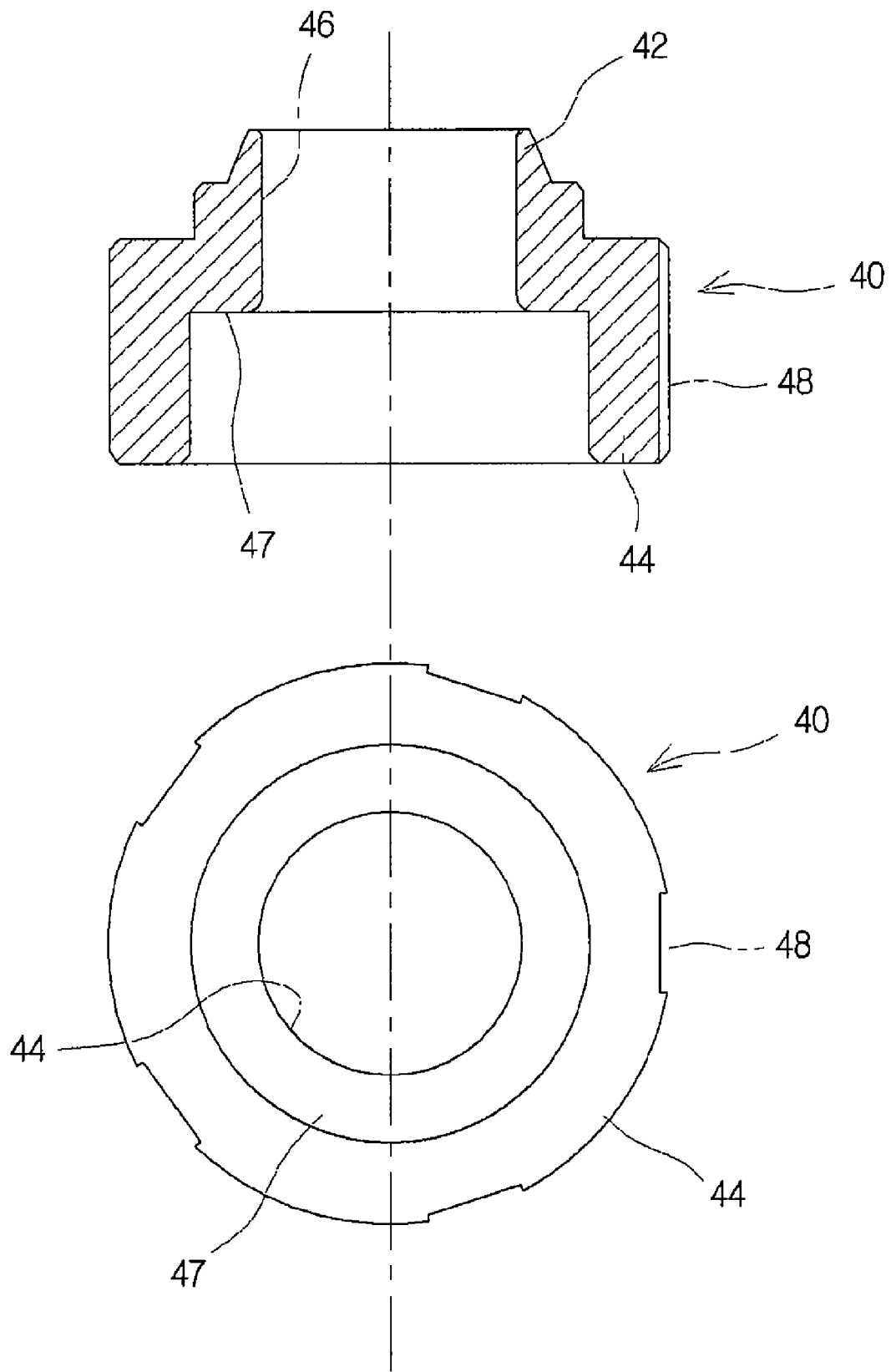
FIGS. 4 and 5 are a cross-sectional view and a bottom view, respectively, of a housing of a motor in accordance with an embodiment of the present invention.
Figure 5:
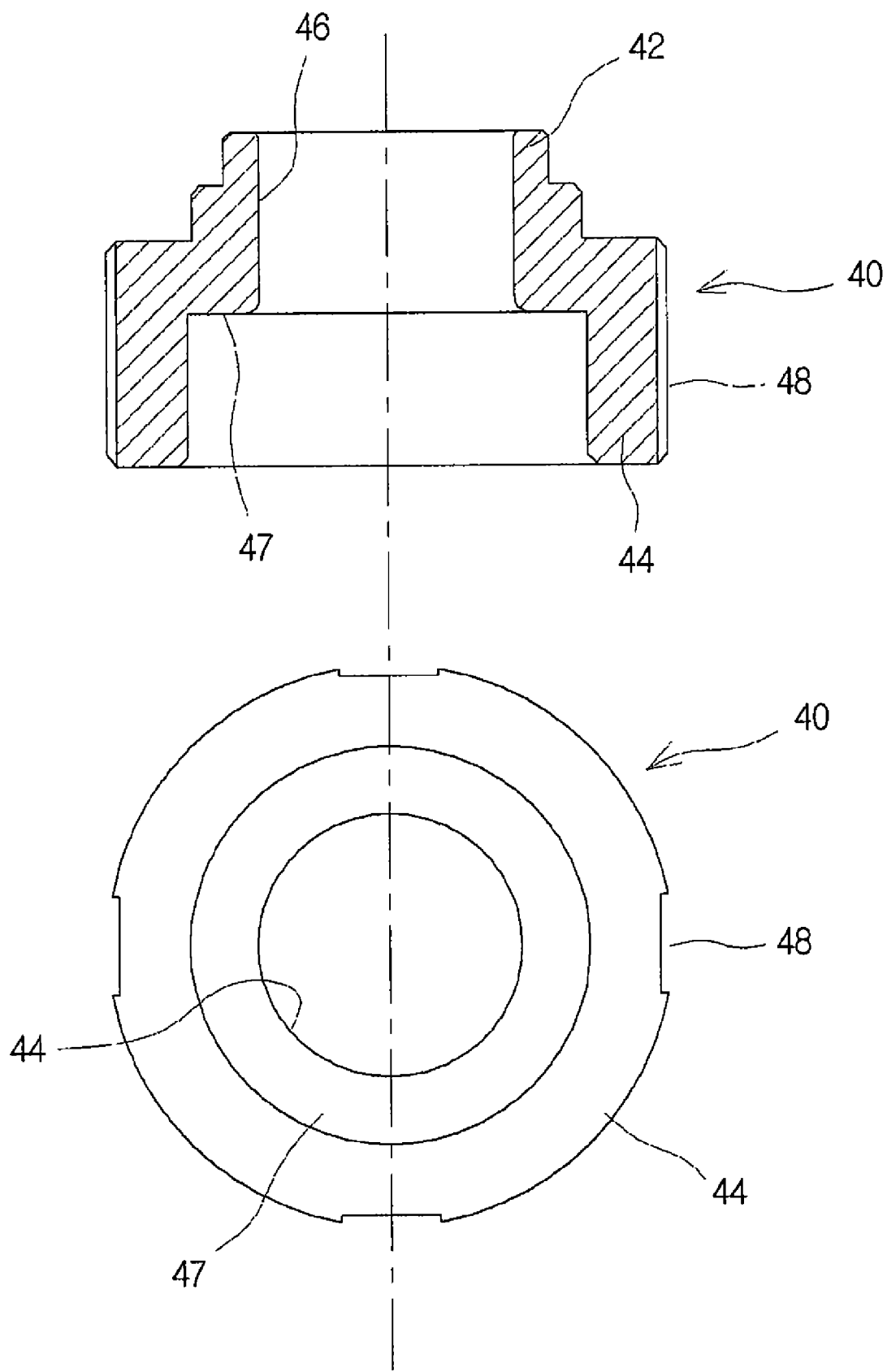

FIGS. 4 and 5 are a cross-sectional view and a bottom view, respectively, of a housing of a motor in accordance with an embodiment of the present invention.

To stably support the rotational axis 10 even in a thin motor, the housing 40 of the present embodiment includes the supporting part 42, which supports the rotational axis 10 even in a concave-shaped space formed between the rotational axis 10 and the protruding part 32 of the hub 30. In this way, the housing 40 can secure a maximum area supporting the rotational axis 10 within a limited height, and thus the rotor can be safely supported even in a thin motor, providing the rotational stability of the rotor. As illustrated in FIGS. 4 and 5, the protruding part 32 is not limited to a particular shape, and the shape thereof can vary, depending on the shape of the protruding part of the hub 30.

The housing 40 also includes a cylindrical mounting part 44, in which electromagnets 70 and 75 and base plates 80 and 85 are slid and installed on an outer circumferential surface for height adjustment. As such, the housing 40 of the present embodiment can be used in motors of various thicknesses.

FIGS. 1 and 2 show the housing 40 that is commonly used in two different motors of different thicknesses. That is, the cross-sectional views of different thicknesses are shown on the left side and right side of the center of the rotational axis 10.

As illustrated in FIGS. 1 and 2, the thicknesses and mounting heights of permanent magnets 22 and 23, electromagnets 70 and 75 and base plates 80 and 85 can be changed according to the change in thickness of the motor. In this way, the cylindrical mounting part 44, on which the electromagnets 70 and 75 and the base plates 80 and 85 are slid, is formed in the housing 40 of the present embodiment such that the electromagnets 70 and 75 and the base plates 80 and 85 of various thicknesses can be mounted on the housing 40 for height adjustment. This enables one type housing 40 to be applicable in motors of various thicknesses.

Here, the electromagnets 70 and 75 and the base plates 80 and 85 can be fitted on the mounting part 44 of the housing 40, allowing an easy assembly and mounting height adjustment.

Furthermore, an outer shelf part 43 that connects the supporting part 42 to the mounting part 44 can be formed on the housing 40 such that a magnet 90, which forms a preload of the motor, can be mounted. Here, the magnet 90 is mounted asymmetrically about the rotational axis 10, and thus an asymmetrical magnetic force, i.e., an asymmetric preload, can be formed. As such, the motor of the present embodiment can effectively prevent a whirling effect of the rotor.

The motor also includes a rotor support 60, which supports an end part of the rotational axis 10 and is installed in the housing 40 such that the rotational axis 10 of the motor can be assembled for height adjustment.

More specifically, as illustrated in FIG. 3, the housing 40 includes an insertion hole 46, through which the rotational axis 10 penetrates, and an inner shelf part 47, which expands the insertion hole 46. The rotor support 60 is installed on the inner shelf part 47 for height adjustment. In this way, a height of the rotational axis 10 supported in the motor can be adjusted.

Here, the rotor support 60 can be fitted in the inner shelf part 47 of the insertion hole 46 of the housing 40, allowing an easy assembly and mounting height adjustment.

In this case, a stopper 62, which prevents the rotational axis 10 from being detached, and a thrust washer 64, which supports the weight of the rotational axis 10, can be installed between the housing 40 and the rotor support 60.

Also, a bearing 50 can be interposed between the housing 40 and the rotational axis 10 for smooth rotation of the rotational axis 10.

Figure 6:
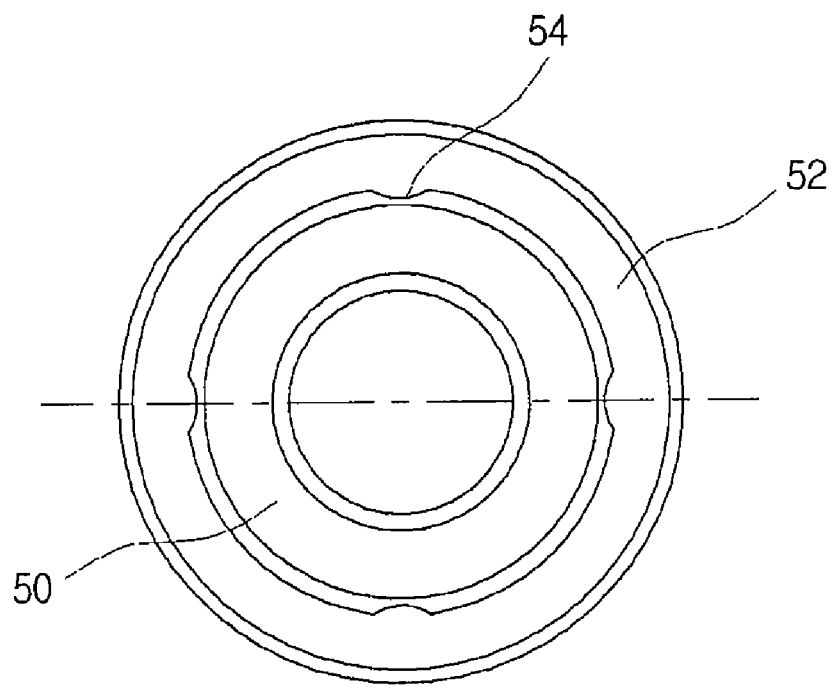
FIGS. 6 and 7 are a cross-sectional view and a bottom view, respectively, of a bearing of a motor in accordance with an embodiment of the present invention.
Figure 6:
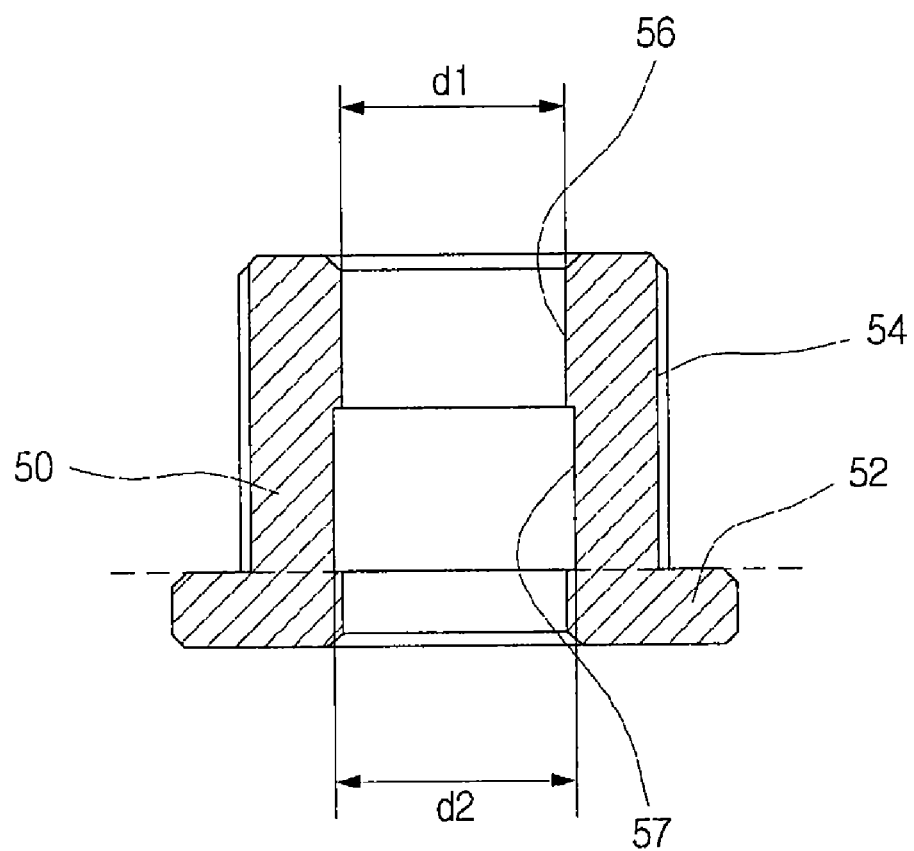
Figure 7:
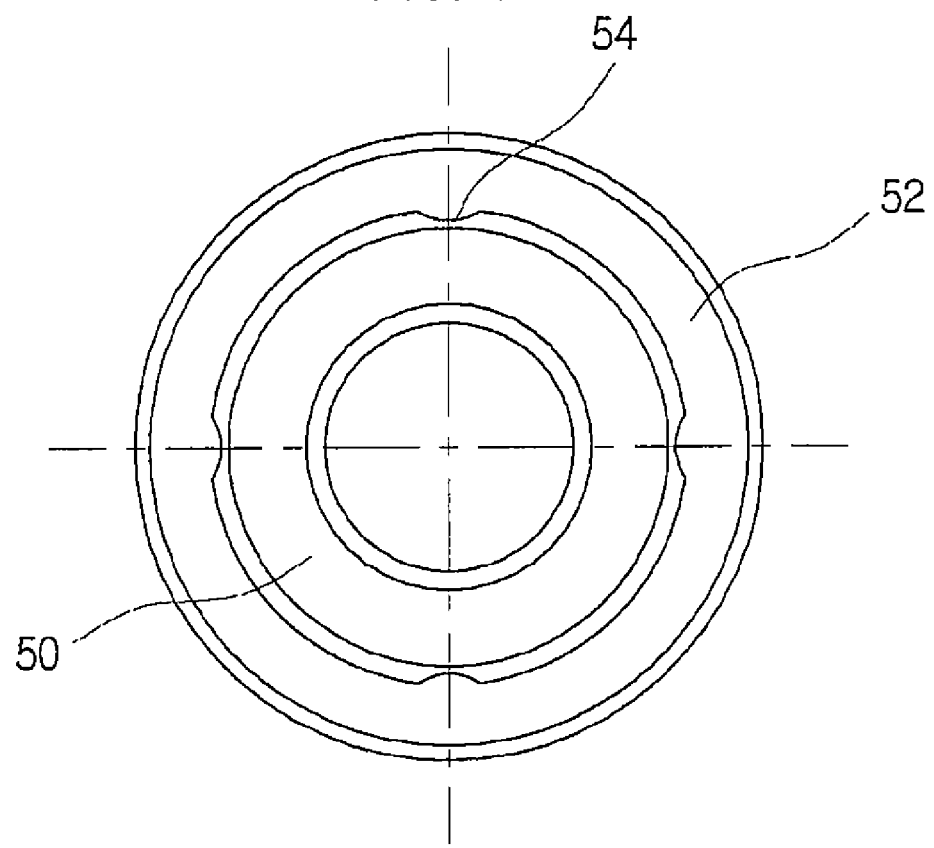
Figure 7:
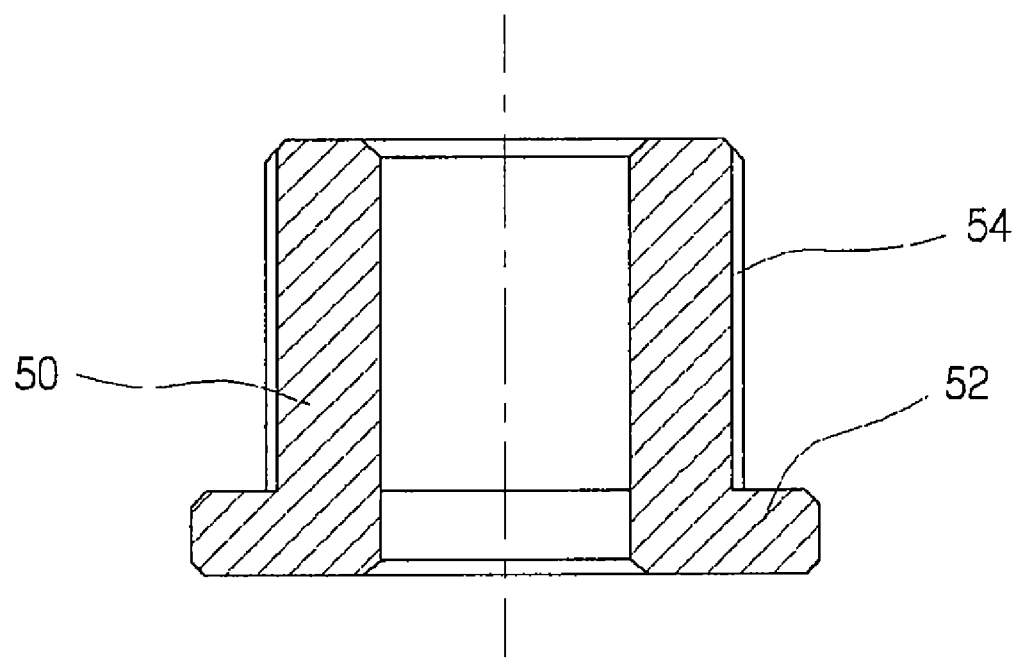

FIGS. 6 and 7 are a cross-sectional view and a bottom view, respectively, of a bearing of a motor in accordance with an embodiment of the present invention.

A flange 52, which is supported by the inner shelf part 47, can be formed in the bearing 50 of the present embodiment so as to allow the bearing 50 to be stably supported by the housing 40.

Also, as illustrated in FIG. 6, a friction reduction indentation 57, which reduces the friction between the rotational axis 10 and the bearing 50, can be formed in a rotational axis hole 56, into which the rotational axis 10 is inserted, reducing the consumption of electric power needed for the rotation of the rotor.

Here, the friction reduction indentation 57 can be easily formed by using the above-described flange 52. First, a diameter expansion part is formed from the rotational axis hole 56 towards the flange 52, and then the flange 52 is pressed towards an inner side of the bearing 50, thereby forming the friction reduction indentation 57. In this case, an end part on the flange side among the end parts forming the friction reduction indentation 57 can be positioned on the same line as an end part forming the flange 52.

Meanwhile, a circulation indentation 54, which forms a path through which a lubricant needed for making the rotational axis 10 and the bearing 50 move easily together is circulated, is formed on an outer circumference of the bearing 50 in a lengthwise direction of the bearing 50. Once the bearing 50 is coupled to the housing 40, the circulation indentation 54 formed on the outer circumference of the bearing 50 forms a circulation path of the lubricant with an inner circumferential surface of the housing 40.

Also, as illustrated in FIG. 1, a ventilation indentation 48 can be formed on an outer circumference of the mounting part 44 in a lengthwise direction of the cylindrical mounting part 44, allowing smooth air circulation inside and outside of the motor.

Here, as illustrated in FIGS. 4 and 5, the number, placement and shape of the ventilation indentation 48 can be variously changed according to the design conditions.

As described above, the motor of the present embodiment can standardize the design and manufacturing of motors because one type of housing can be used in motors of various thicknesses.

While the spirit of the present invention has been described in detail with reference to a particular embodiment, the embodiment is for illustrative purposes only and shall not limit the present invention. It is to be appreciated that those skilled in the art can change or modify the embodiment without departing from the scope and spirit of the present invention.

As such, many embodiments other than that set forth above can be found in the appended claims.

What is claimed is:

1. A motor comprising:
   a rotational axis;
   a rotating body configured to rotate together with the rotational axis as one unit;
   a hub having a ring-shaped body and a protruding part, the ring-shaped body being interposed between the rotational axis and the rotating body, the protruding part being protruded from the ring-shaped body towards the rotational axis and being in contact with the rotating body so as to extend an outer circumferential surface of the ring-shaped body coupled to the rotating body; and
   a housing configured to support and rotate the rotational axis, the housing having a supporting part being interposed between the rotational axis and the protruding part of the hub and configured to support the rotational axis.

2. The motor of claim 1, wherein the housing further comprises a cylindrical mounting part, in which an electromagnet and a base plate are slid on an outer circumferential surface for height adjustment.

3. The motor of claim 2, wherein the electromagnet and the base plate are fitted on the mounting part of the housing.

4. The motor of claim 2, wherein the housing further comprises an outer shelf part configured to connect the supporting part to the mounting part, and
   the motor further comprises a magnet mounted on the outer shelf part.

5. The motor of claim 4, wherein the magnet is disposed asymmetrically about the rotational axis.

6. The motor of claim 2, wherein the housing further comprises an insertion hole, through which the rotational axis penetrates, and an inner shelf part configured to expand the insertion hole, and
   the motor further comprises a rotor support being coupled to the inner shelf part and configured to support the rotational axis.

7. The motor of claim 6, wherein the rotor support is fitted in the insertion hole of the housing.

8. The motor of claim 6, further comprising a bearing being interposed between the hosing and the rotational axis and having a flange supported by the inner shelf part.

9. The motor of claim 8, wherein the bearing further comprises a friction reduction indentation formed in a depressed center portion of a rotational axis hole, into which the rotational axis is inserted.

10. The motor of claim 9, wherein an end part of the friction reduction indentation on the flange side is positioned on the same line as an end part of the flange.

11. The motor of claim 8, wherein a circulation indentation, through which a lubricant is circulated, is formed on an outer circumferential surface of the bearing in a lengthwise direction of the bearing.

12. The motor of claim 2, wherein a ventilation indentation is formed on an outer circumferential surface of the mounting part in a lengthwise direction of the cylindrical mounting part.

* * * * *